US008533215B2

(12) United States Patent
Szabo et al.

(10) Patent No.: US 8,533,215 B2
(45) Date of Patent: Sep. 10, 2013

(54) GEO-TARGETED DATA COLLECTION OR OTHER ACTION

(75) Inventors: Jason Leslie Szabo, Erie, CO (US); Charles Frankel, Denver, CO (US)

(73) Assignee: Microsoft Corporation, Redmond, WA (US)

( * ) Notice: Subject to any disclaimer, the term of this patent is extended or adjusted under 35 U.S.C. 154(b) by 68 days.

(21) Appl. No.: 13/118,505

(22) Filed: May 30, 2011

(65) Prior Publication Data

US 2012/0310967 A1    Dec. 6, 2012

(51) Int. Cl.
*G06F 17/30* (2006.01)

(52) U.S. Cl.
USPC .......................................... 707/766; 340/989

(58) Field of Classification Search
USPC ......... 707/723–736, 759–769; 340/988–994, 340/995.1, 995.11–19, 995.2, 995.21–23
See application file for complete search history.

(56) References Cited

U.S. PATENT DOCUMENTS

| | | | |
|---|---|---|---|
| 5,815,417 A * | 9/1998 | Orr et al. | 703/5 |
| 7,680,859 B2 | 3/2010 | Schiller | |
| 7,844,590 B1 | 11/2010 | Zwicky et al. | |
| 2008/0071586 A1 * | 3/2008 | Logan | 705/4 |
| 2009/0171980 A1 * | 7/2009 | Meadow et al. | 707/10 |
| 2010/0325129 A1 | 12/2010 | Ahuja et al. | |
| 2011/0320116 A1 * | 12/2011 | DeMaio et al. | 701/201 |
| 2012/0256770 A1 * | 10/2012 | Mitchell | 340/989 |

OTHER PUBLICATIONS

Noack, David, "Spatial Variation in Search Engine Results", Retrieved at <<http://wwwalt.phil-fak.uni-duesseldorf.de/infowiss/admin/public__dateien/files/1/Noack__HICSS.pdf>>, Proceedings of the 43th Annual Hawaii International Conference on System Sciences (HICSS-43), Jan. 5-8, 2010, pp. 1-10.
Backstrom, et al., "Spatial Variation in Search Engine Queries", Retrieved at <<http://www.cs.cornell.edu/home/kleinber/www08-spatial.pdf>>, The 17th International World Wide Web Conference, Apr. 21-25, 2008, 10 pages.
Fisher, Danyel, "Hotmap: Looking at Geographic Attention", Retrieved at <<http://citeseerx.ist.psu.edu/viewdoc/download-?doi=10.1.1.73.815&rep=rep1&type=pdf>>, IEEE Transactions on Visualization and Computer Graphics, vol. 13, No. 6, Oct. 27, 2007, 8 pages.
Gravano, et al., "Categorizing Web Queries According to Geographical Locality", Retrieved at <<http://citeseerx.ist.psu.edu/viewdoc/download?doi=10.1.1.4.9531&rep=rep1&type=pdf>>, 12th International Conference on Information and Knowledge Management, Nov. 3-8, 2003, 9 pages.

* cited by examiner

*Primary Examiner* — Wilson Lee

(57) ABSTRACT

Information may be associated with geographic locations, and requests for this information may be used to determine future actions. In one example, a search engine returns results that refer to places having physical geographic locations. If imagery of the geographic locations is available, the imagery may be shown to the person who requests the information. If imagery is not available, this unavailability may be treated as a failure. If a number of failures occurs in a geographic area, then resources (e.g., a car with a camera) may be deployed to collect imagery of that area. In another example, knowledge about a geographic concentration of requests might be used to disambiguate a request relating to a larger area (e.g., requests relating to "Minneapolis" might be focused on the area near the I-35 bridge, if data show that many requests in Minneapolis are for the area around that bridge).

20 Claims, 5 Drawing Sheets

GEO-TARGETED DATA COLLECTION OR OTHER ACTION

BACKGROUND

Information that is returned with search results may be associated with a geographic location. For example, a search might return, as a result, a particular restaurant, museum, bank, or other type of entity. These entities may exist at a physical location, and—when an entity is identified as a search result—it is theoretically possible to provide imagery of the physical location, such as a street-side image of the building in which the entity is located. However, in many cases, the imagery cannot be provided because it has not yet been collected.

Many search engine operators and other information providers seek to collect imagery of many locations so that they can provide this imagery upon request. However, it may not be practical to collect imagery of every existing location. In general, when it is labor-intensive to collect a type of information, there may be only a limited amount of that information available. Imagery that has to be collected from a moving vehicle is one example of information that is labor-intensive to collect, although there are other examples of such information (e.g., information collected through surveys that have to be administered by a live person).

SUMMARY

The geographic location associated with information that has been requested may be used to affect the choice of what new information to collect. In one example, a search engine may provide results that are associated with geographic locations—e.g., a result might be a business or a point of interest, in which case the geographic location associated with the result is the physical location of the business or point of interest. A database may store imagery, such as street-side photographs of streets. If the database does not contain an image of the location associated with a particular result, then the event of not having an image to provide is recorded as a failure. Failures are analyzed to determine where to collect new imagery. The imagery may then be collected, for example, by driving a car to the geographic area for which the failures have occurred, flying an airplane over that area, or by some other mechanism.

A system may choose geographic areas in which to collect imagery based on where the collection of new imagery is likely to lead to a relatively high benefit-to-cost ratio. For example, if a high failure rate is concentrated in a small geographic area, then a car can be sent to that area to take photographs. If the failure rate appears to be trending upward in a particular geographic area, then that area can be photographed even if there are other areas that have a higher absolute failure rate. When there are limited resources for collection of imagery (e.g., a limited number of photo cars, limited budget to deploy these cars), the resources can be used in the way that will maximize the value of the collection—e.g., imagery could be collected in a place where the failures are more geographically concentrated instead of those areas where the failures are geographically sparser. It is noted that a system could deploy resources to collect imagery in response to failures, but could also collect other types of information instead of imagery.

Information about the geographic locations for which people are searching could be used to determine where to devote information-collection resources, but also could be used in other ways. For example, if a search engine receives a query that refers to a large region (e.g., a query for "Minneapolis"), the system might want to determine what point in that region is to be used as a response. For example, if data show that many queries relating to Minneapolis are for a particular tourist attraction in that city, then a system could respond to queries for "Minneapolis" with the location of that specific attraction, rather than using the center of the city, or an arbitrary location within the city.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
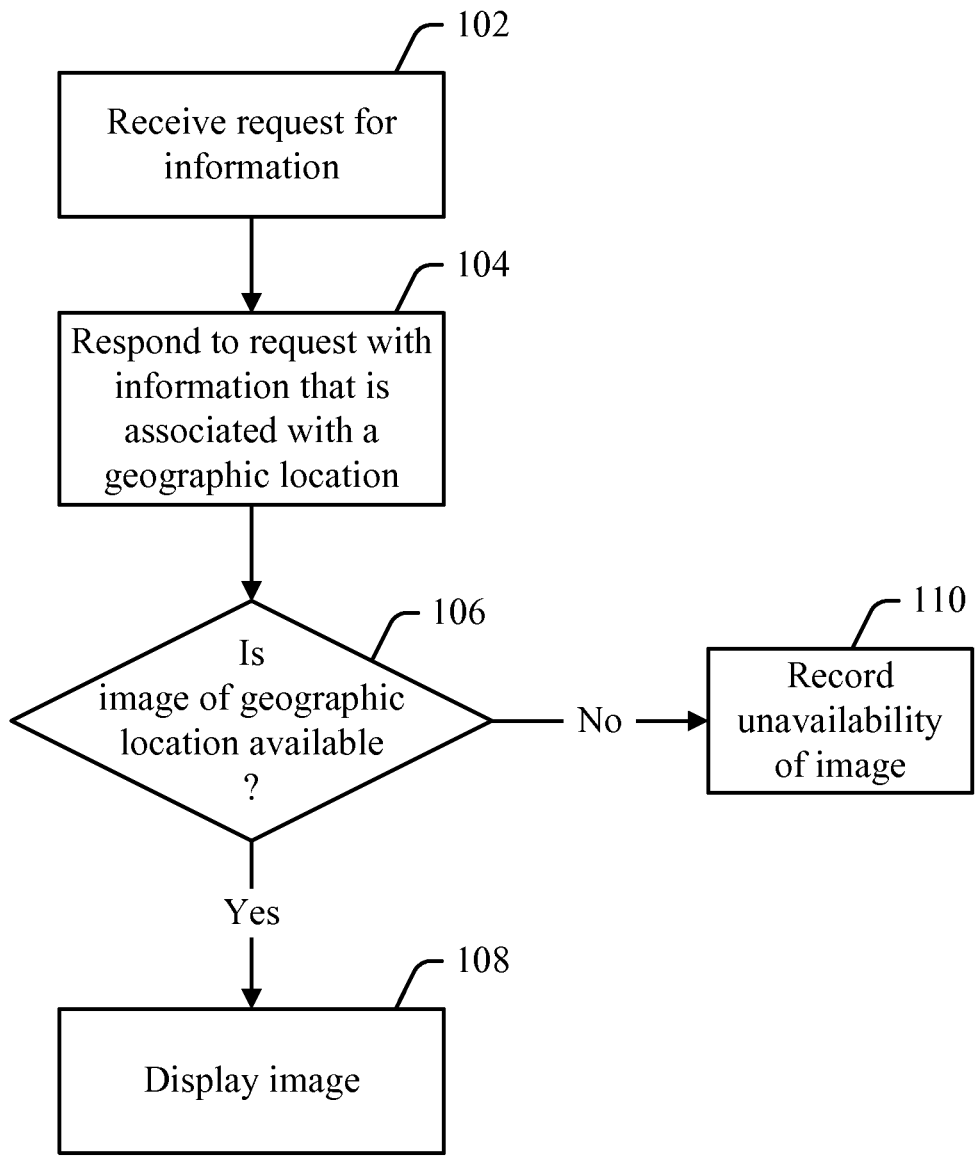
FIG. 1 is a flow diagram of an example process in which imagery may be provided, or in which the imagery's lack of availability may be detected.

In many situations, information is associated with a geographic location. For example, a user might be looking for a French restaurant in a particular city. If the user requests this information from a search engine, the search engine might return, as a result, the web site or directory entry for the restaurant. In this case, the physical address of the restaurant is a geographic location associated with the result. Thus, some systems that provide information may seek to provide an image of the geographic location associated with a given piece of information. In the example where the information to be returned is the web site or directory entry of a restaurant, the image to be returned might be a street-side or aerial image of the restaurant.

Image data may be labor- or resource-intensive to collect. For example, collecting street-side imagery generally involves driving a car with a camera mounted thereon through the streets to be covered. Driving such a car down every street in a geographic region consumes resources—e.g., salary for the driver, fuel and maintenance for the car, etc. Since the businesses that obtain this type of imagery have limited resources, they may want to deploy the resources in a way that gives them relatively high value for the expenditure of resources.

The subject matter herein provides a way to use geographic information associated with searches in order to make decisions. One example of such a decision is how to deploy image-collection (or other data-collection) resources. In order to use geographic information to make a decision about how to collect imagery, the results from search queries are analyzed. For each result, it is determined whether an image associated with the result exists (e.g., if the result is a business, the relevant image might be said to exist if there is a street-side image of the business's address). If such an image exists and is of high quality, the search for such an image is considered a successful event. Otherwise, the event is considered a failure. Failure events are recorded. The failures may be analyzed to determine where the failures are geographically concentrated. When failures (or a trend toward a higher failure rate) is concentrated in a particular geographic area, resources may be deployed to collect imagery of that area. For example, if a particular square mile of a city contains a high rate of failures, a photo car may be deployed to that area to collect street-side images of the streets in that square mile. In general, resources to collect images may be deployed in areas where each resource unit is expected to yield a relatively high reduction in the failure rate. Since collecting images in an area with a geographically-dense failure rate may be expected to remedy relatively high number of failures per unit of distance traveled by the photo car, in general image collection may be focused on areas that have a high density of failures.

Collecting images is merely one example of an action that may be taken based on the geographic information associated with searches. In another example, there might be some type of human-labor-intensive data collection (e.g., a telephone survey) that could be performed based on where the failures are located. For example, if a travel web site provides information about hotels, and if the hotels in a particular region have not yet been subject to a telephone survey, then a high failure rate in that region could cause the survey to be taken for hotels in that region. Another example of how geographic information could be used is to direct, to a specific location, the results of a geographic search whose query otherwise refers to a large, general area. For example, a search for "Minneapolis" could refer to any point within the approximately sixty square miles covered by that city. However, if a large number of searches in Minneapolis are for a particular tourist attraction (e.g., the Mary Tyler Moore statue), then a search for "Minneapolis" could be responded to with the specific location of that attraction, rather than using an arbitrary or central location within the city of Minneapolis. Or a search for "restaurants in Minneapolis" could include, among the top results, restaurants that are near the attraction.

Turning now to the drawings, FIG. 1 shows an example process in which information, such as imagery, may be provided, or in which its lack of availability may be detected. At 102, a request for information may be received. In one example, the request may take the form of a search query issued by a user—e.g., a user may be requesting restaurants, banks, museums, etc., in a particular city. However, the request for information could take any appropriate form.

At 104, the request is responded to with some piece of information. For example, the request for information might be a search, such as a text-only search (e.g., "Starbucks") or a geographic search (e.g., "coffee house near zip code 98052"). In this case, the response could be a web site or directory entry associated with a coffee house (or a list of web sites or directory entities associated with a set of coffee houses).

As discussed above, a piece of information may be associated with a geographic location. For example, the piece of information might be the web site or directory entity of a particular business (e.g., the coffee house mentioned above), or the web site or directory entry for some other type of entity. In such an example, the geographic location associated with the information is the physical location (point on a map) where the entity is located. In another example, the information might be a "place page" associated with an object that does not have a web site or directory entity—e.g., the Tacoma Narrows Bridge might have a "place page" on a particular search engine even if it does not have a web site or a directory entry. In such an example, the geographic location associated with the information is the physical location of the object to which the information refers. In general, any appropriate piece of information could be associated with a geographic location.

At 106, it may be determined whether an image is available for the geographic location associated with a piece of information. The imagery may take the form of street-side imagery captured from a land vehicle (such as a car or truck), aerial imagery captured from an airborne vehicle, imagery taken of the interior of a business or other entity by a human with a camera, or any other type of imagery. Such imagery might be available or unavailable. For example, if one of the pieces of information that is provided in response to a request is the address of a Starbucks coffee house in Redmond, Wash., a particular system might, or might not, have a street-side image of that Starbucks. If such an image exists, then the image may be displayed with the results (at 108), or might otherwise be made available for a user to see. If the image is not available, then the fact of the image's unavailability may be recorded (at 110). (And, of course, since the image is unavailable for a particular result, no image of the geographic location associated with that result is displayed.)

Figure 2:
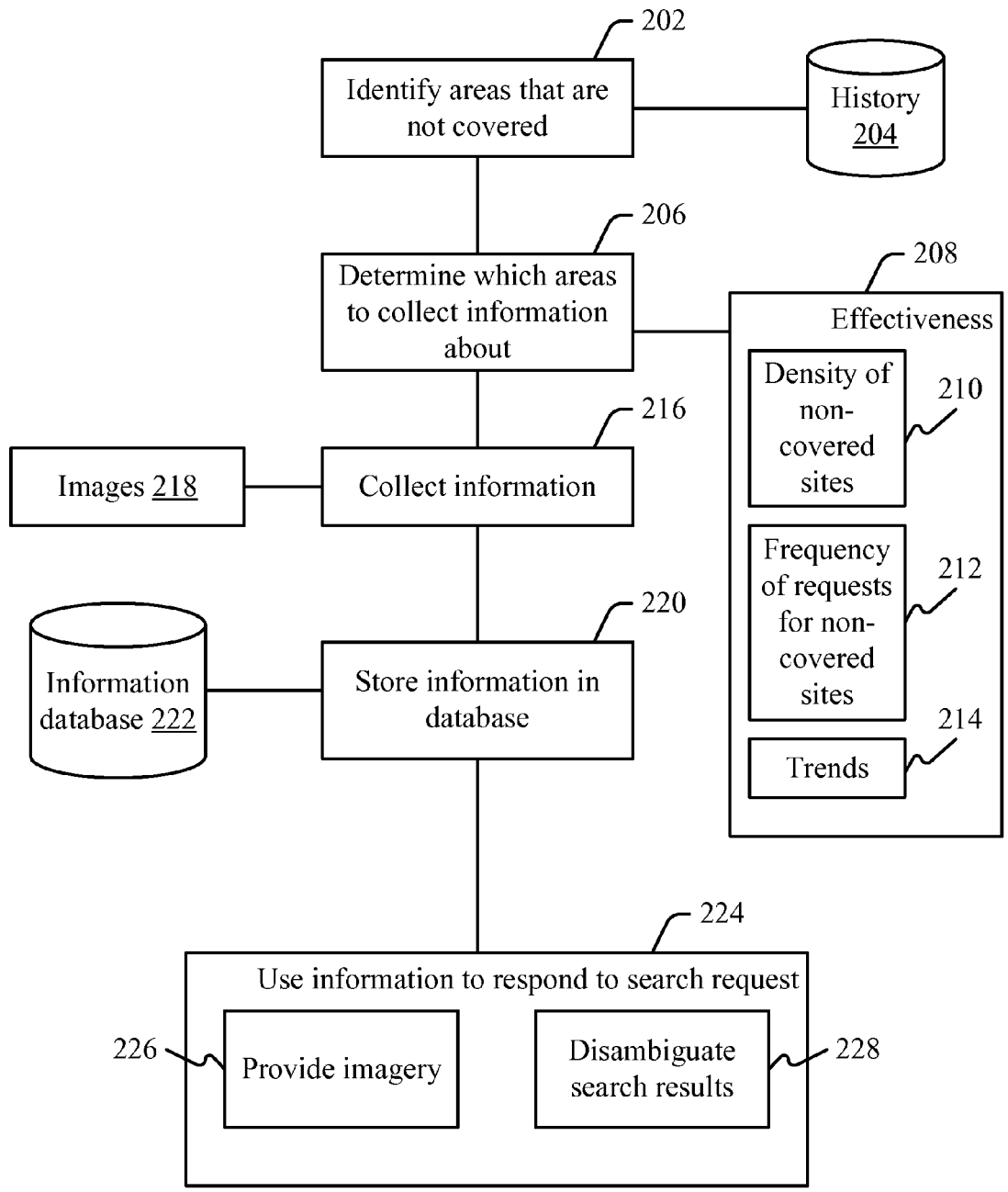
FIG. 2 is a flow diagram of an example process that may be carried out with respect to information that is unavailable, or with respect to information indicating geographic areas in which people are looking for information.

Certain aspects of the subject matter herein address what to do in response to the unavailability of images (or other types of information). FIG. 2 shows an example process that may be carried out with respect to information that is unavailable (or, more generally, with respect to information concerning the geographic areas in which people are looking for information). Before turning to a description of FIG. 2, it is noted that FIG. 2 is described, by way of example, with reference to components shown in FIG. 1, although this process may be carried out in any system and is not limited to the scenario shown in FIG. 1. Additionally, the flow diagram in FIG. 2 shows an example in which stages of a process are carried out in a particular order, as indicated by the lines connecting the blocks, but the various stages shown in this diagram can be performed in any order, or in any combination or sub-combination.

At 202, the process of FIG. 2 may identify areas that are not covered. "Not covered", in this example, refers to the unavailability of some type of information concerning that area. One example of information that might be unavailable is the imagery mentioned above. Thus, in one example, determining that an area is "not covered" refers to determining that imagery of a particular geographic location has not been collected. However, there are other examples of finding that an area is not covered. For example, a particular information provider might seek to have certain entities complete questionnaires (e.g., a hotel review site might seek to have the manger of each rated hotel complete a questionnaire about the hotel property). In such a case, the fact that no questionnaire has been completed for a particular hotel property indicates that the property is "not covered," in which case the non-existence of a questionnaire about a particular property is an example of the "non-coverage" of that property. (Moreover, even in the case where the information to be collected is imagery, outdoor imagery of a geographic area is merely one example of the type of imagery that could be collected. In another example, imagery of the interior of a business or other entity could be collected—e.g., businesses could request (or a decision could otherwise be made) to have a person photograph the inside of a business's building, and a decision could be made about how to deploy the labor and resources to take such photographs.) In one example, the determination of which areas are non-covered may be made by examining a history 204 of requests for information and/or results. For example, if a search engine has returned the web site for a particular coffee house as a result fifty times, and if each time the search engine has been unable to provide an image of the coffee house because no such image is available, then the history may show fifty past failures at the location of that coffee house. The history 204 may also show specific information about the failures such as the time at which the failure occurred, the particular search query in response to which the failure occurred, or any other appropriate type of information.

At 206, a decision may be made as to which areas to collect information for. The collection of information (e.g., the photographing of street-side images) may be an expensive operation that involves the use of scarce resources. Thus, a system may seek to optimize the use of these resources by deploying the resources to collect information in a way that maximizes the effectiveness 208 of the collection efforts. In general, an effort to collect information may be considered effective if it reduces (or can be predicted to reduce) future failure rates by preventing some failures that otherwise would have occurred. Thus, given a choice of where to deploy the collection resources, a system may choose to deploy the resources in a way that collects a large amount of information that is expected to be requested in the future per unit of resources expended. Or, to state it mathematically, if a system can choose between two different collection strategies—one of which is expected to eliminate m failures per resource unit expended, another of which is expected to eliminate n failures per resource unit expended, where m is greater than n—the system may choose the strategy that is expected to eliminate m failures per resource unit since the return on investment would be greater. In such a case, the strategy that is expected to eliminate m failures per resource unit expended can be said to be more effective than the other strategy.

One problem in assessing effectiveness of the strategy is that the effectiveness is based on the number of future failures that will be eliminated by the information collection efforts, which may involve a prediction concerning what type of information will be requested in the future. Such predictions involve uncertainty, but certain heuristics can be used to help to make the decision about what strategy will be effective. Some examples are show in FIG. 2 inside the box that represents effectiveness 208.

One example factor that may be considered in determining the effectiveness of an information collection strategy is the geographic density 210 of non-covered sites. For example, if each of two geographic regions has recorded one-thousand failures, but one region is one square mile and the other region is ten square miles, then the failure rate is denser in the first region than in the second region. In order to increase effectiveness of the collection resources, it may make sense to focus collection efforts on the one-square-mile area rather than the ten-square mile area. All other things being equal, it may take a fixed amount of resources to cover a square mile. In such a case, covering an area that has 1000 failures per square mile rather than 1000 failures per ten square miles may lead to a greater reduction in the future failure per unit of resources expended—assuming that the historical failure rate for a geographic region is indicative of the future failure rate for that region.

Another example factor that may be considered in determining effectiveness of an information collection strategy is the frequency 212 of requests for non-covered sites. For example, a given region might have only two non-covered sites. However, if these two non-covered sites have experienced a large number of requests (and, therefore, a large number of failures), then expending resources to collect information in that region might be effective even if the actual number of sites that are being requested in that region is small.

Figure 3:
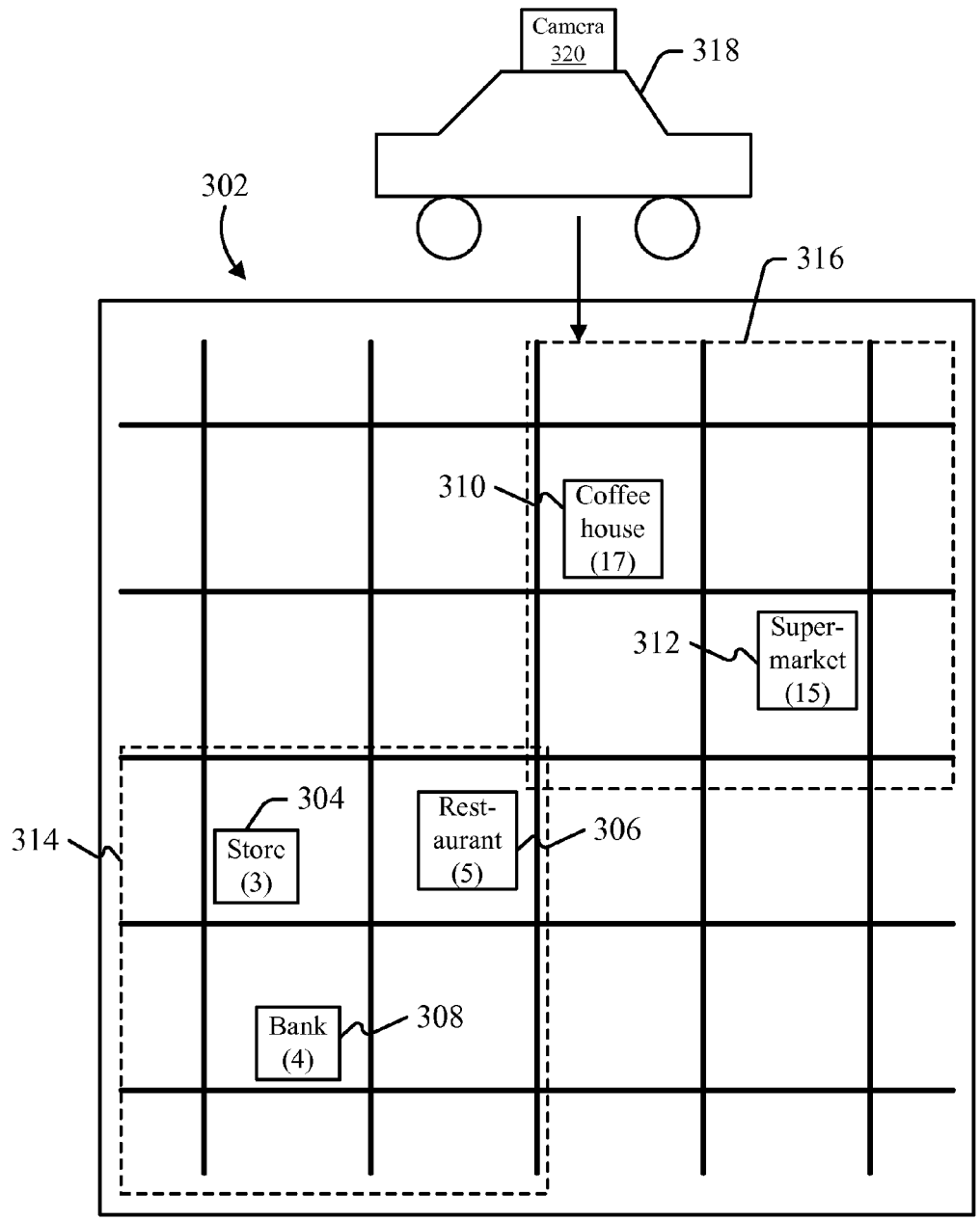
FIG. 3 is a block diagram of example geographic regions in which failures may occur.

FIG. 3 shows the interplay between the density of non-covered sites and the frequency of requests for sites. FIG. 3 shows a map 302 of a street grid. On map 302 are shown the geographic locations of various entities in which failures have occurred due to some type of non-coverage, such as the unavailability of street-side imagery of those entities. In the example of FIG. 3, the non covered entities are store 304, restaurant 306, bank 308, coffee house 310, and supermarket 312. The first three of these entities—store 304, restaurant 306, and bank 308—are located in region 314. The latter two entities—coffee house 310 and supermarket 312—are located in region 316. For purposes of the example of FIG. 3, it is assumed that regions 314 and 316 are non-covered—e.g., it may be the case that no street-side imagery of these regions has been collected. A system that collects and/or provides imagery may have limited resources to expend on resource collection—e.g., there might be a single car 318 with a camera 320 mounted thereon, and sending the car to photograph a region costs money in terms of gas for the car, salary for the driver, wear-and-tear on the car, etc. Thus, the operator of that system might only be able to send the car either to region 314 or to region 316, but not both, and thus might have to choose the region to which to send the car. (Or, in an alternative scenario, the operator of the system might be able to send the car to both regions, but might have to decide which region is to be covered first, and which region is to be covered later.)

In the example of FIG. 3, region 314 contains three sites that have generated failures, and region 316 contains two sites that have generated failures. Thus, sending car 318 to photograph region 314 will cover more points of failure than sending car 318 to region 316. But while region 316 has fewer failed sites than region 314, region 316 also has a larger number of failures. The numbers in parentheses indicate the number of times that a particular site was provided as a result without imagery being available, and thus the number of failures that site generated. By adding the numbers in parentheses, it can be seen that the frequency of failures in region 316 (17+15=32) is higher than in region 314 (3+5+4=12), even though the density of failed sites is higher in region 314. A system could choose the region in which to expend information-collection resources based on the density of failed sites in the region, or based on the frequency of failures in the region, or based on some combination of these (or other) factors.

Returning now to FIG. 2, another example factor that may be considered in determining the effectiveness of an information collection strategy is trends 214. Trends 214 represent changes in the frequency with which a particular item is requested (as indicated by how frequently failures are being recorded for the imagery associated with that item). If one imagines a function that represents the total number of failures received for an item (or geographic region) since some point in time, then a positive trend might be discerned if the first derivative of the function is positive (that is, if the function has a positive slope), or if the second derivative is positive (that is, if the slope is increasing). A trend might suggest that a particular item will generate many requests in the future, even if the absolute number of requests that are presently being received is low. As noted above, resources to collect information may be deployed in a way that is designed to eliminate future failures; if a particular item or geographic region appears to be trending upward in the number of requests that it receives, then deploying resources to collect information about the region (e.g., sending a car to photograph the region) may yield a worthwhile return on investment.

Once it has been determined, at 206, which areas to collect information about, the information may be collected at 216. As noted above, one type of information that could be collected is imagery 218, although any appropriate type of information (e.g., responses to questionnaires) could be collected. At 220, the collected information may be stored in a database 222 which may be consulted at a later time (e.g., street-side imagery could be stored in database 222, so than a street-side image of a search result could be shown in response to a search request).

At 224, the information that is collected may be used to respond to a request for information, such as a search result. One way of using the information is to provide the information (e.g., imagery) along with a set of search results (block 226). Another example way of using the information is to disambiguate search results (block 228). For example, if a search request is for "Minneapolis", this request could refer to locations anywhere within the city of Minneapolis. However, if a particular spot in the city of Minneapolis has been the subject of many search requests, then a request for "Minneapolis" could return a specific location (e.g., the location of a particular bridge, a particular sports venue, a particular neighborhood, etc.), on the theory that a place that others have searched for has a good chance of being what one wants to see when he requests "Minneapolis." The fact that a location within Minneapolis has been requested frequently could be determined from the failure records, or could be determined from the history of search requests generally (whether or not those search requests result in failures).

Figure 4:
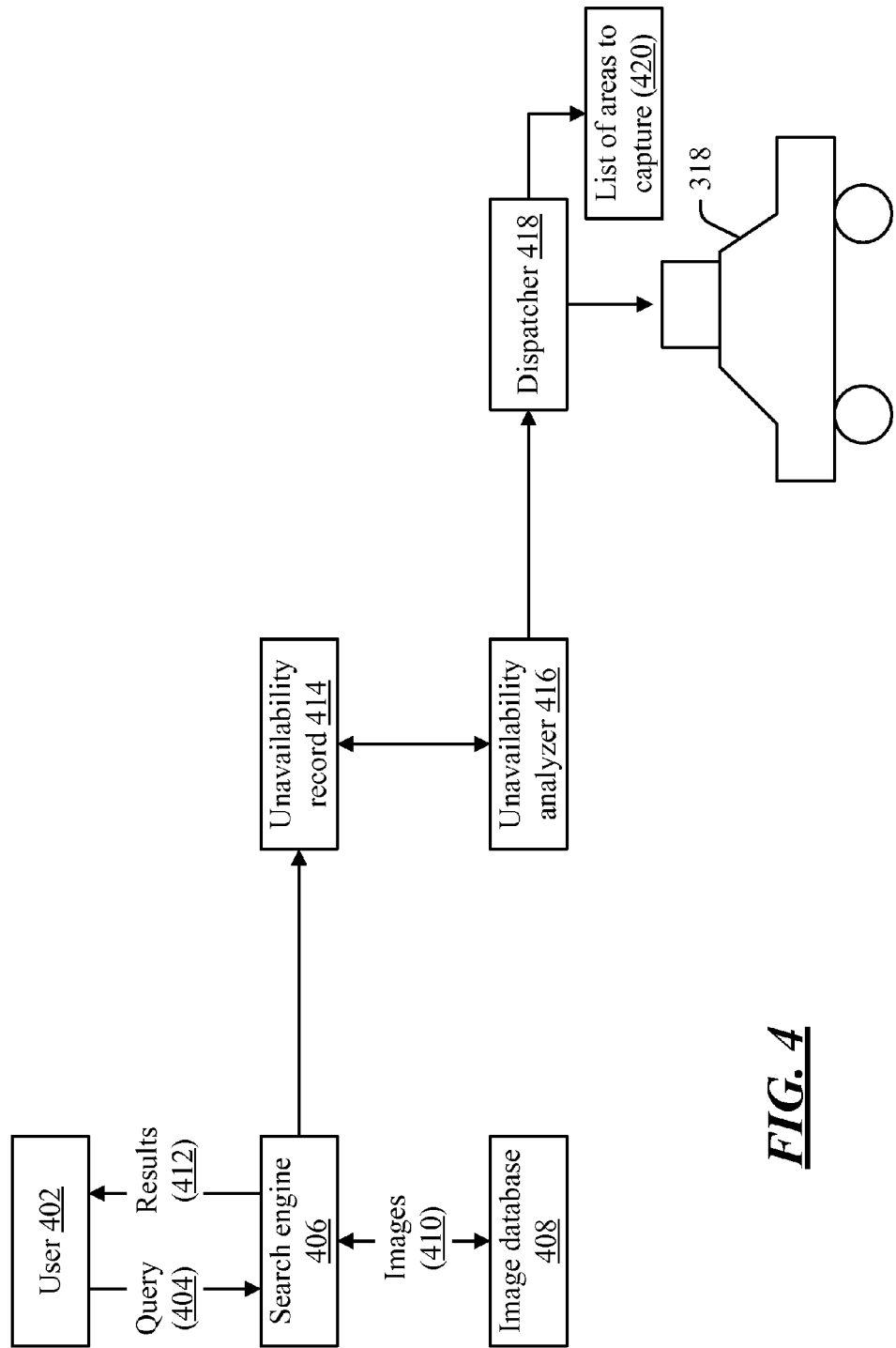
FIG. 4 is a block diagram of an example set of components with which the techniques described herein may be used.

FIG. 4 shows an example set of components with which the techniques described herein may be used. In the example, shown user 402 may enter a query 404 into search engine 406. The search engine may generate a set of results using techniques that are generally known in the fields of search engines and data retrieval. For example, if the user enters a query such as "coffee house 98052", the search engine might find a set of coffee houses that are located near zip code 98052, and might return the Uniform Resource Locators (URLs) of the web sites for those coffee houses, or the URLs of directory entries for those coffee houses. (In one example, the user might enter only "coffee house", and the location in which the user is searching for a coffee house might be inferred from the user's present location.)

As noted above, a result may be associated with a geographic location. Search engine 406 may want to provide imagery relating to the results, so search engine 406 may look in image database 408 to determine whether there are images of the geographic locations associated with the results. If such imagery exists, then the images 410 may be returned to search engine 406, and may be included along with the results 412 that search engine 406 provides to user 402. If no such imagery exists, then results 412 may be provided without the imagery, and an unavailability record 414 may be created. Unavailability record 414 contains data indicating the fact that an attempt was made to find imagery for a particular geographic location and that no such imagery was available.

At some point in time, an unavailability analyzer 416 may examine the set of unavailability records (such as unavailability record 414) to determine which locations people appear to be looking for and for which no imagery exists. Unavailability analyzer 416 may then determine where to deploy image-collection resources in order to collect images that previously have been found to be unavailable. Unavailability analyzer 416 may make this determination using criteria such as those discussed above in connection with FIG. 2 (e.g., the density of non-covered sites, the frequency with which non-covered sites are requested, trends in requesting sites, etc.). Based on the analysis produced by unavailability analyzer 416, a dispatcher 418 may dispatch a collection resource in pursuit of imagery of the non-covered locations. An example of such a collection resource is camera car 318. Dispatcher 418 may provide the collection resource or its operator (e.g., the driver of car 318) with a list 420 of areas to capture. This list may take the form of a map showing the region to be covered, or might be a specific list of directions (e.g., "Drive down the 200 block of Elm Street, then turn right on main . . . "). In general, list 420 could take any appropriate form.

Figure 5:
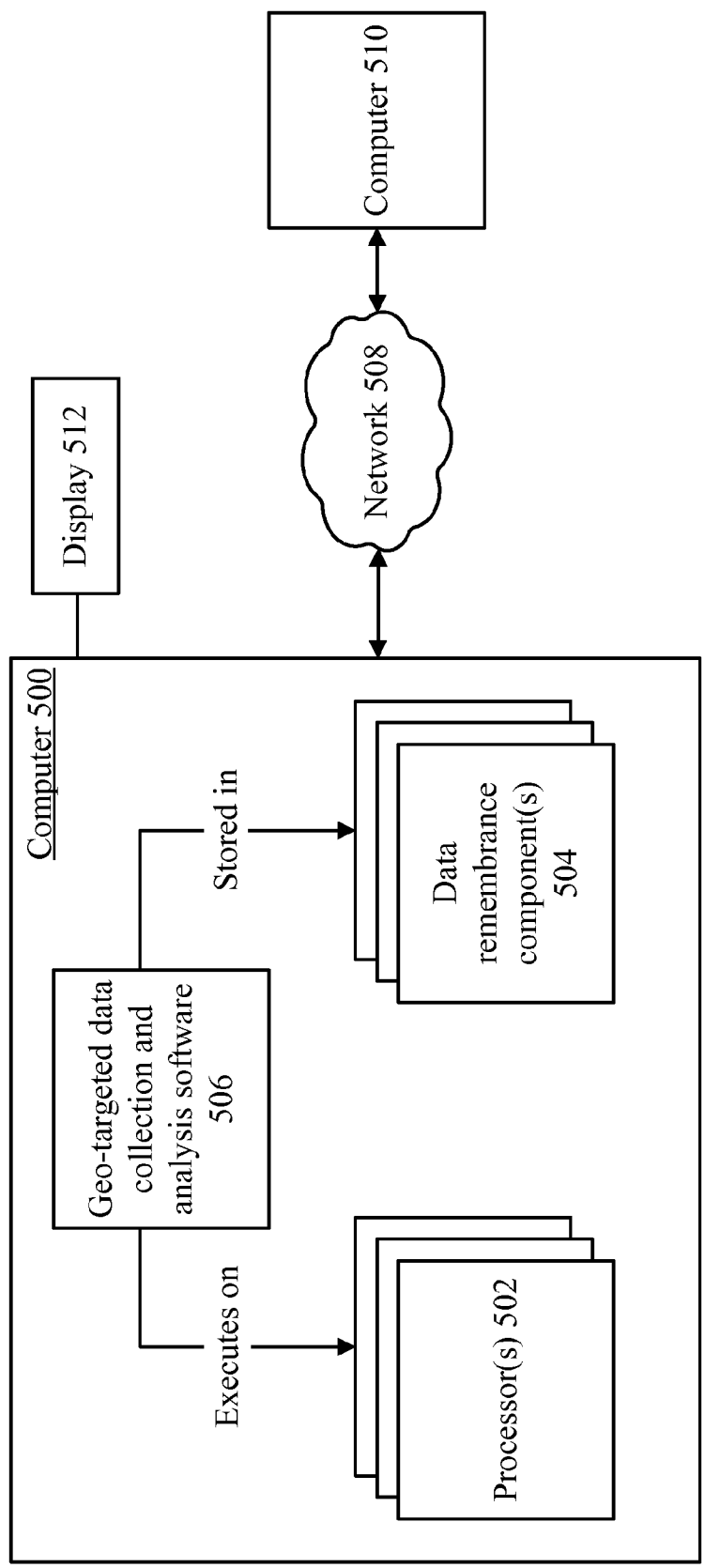
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is geo-targeted data collection and analysis software 506, which may implement some or all of the functionality described above in connection with FIGS. 1-4, although any type of software could be used. Software 506 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium. It is noted that there is a distinction between media on which signals are "stored" (which may be referred to as "storage media"), and—in contradistinction—media that transmit propagating signals. DVDs, flash memory, magnetic disks, etc., are examples of storage media. On the other hand, wires or fibers on which signals exist ephemerally are examples of transitory signal media. The media on which instructions are stored may be a memory, which is a component (e.g., RAM, flash memory, optical disk, etc.) that stores data durably for a period of time, rather than only propagating or transiting the data.

Additionally, any acts described herein (whether or not shown in a diagram) may be performed by a processor (e.g., one or more of processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected.

In the claims herein, two items may be described as being "distinct" from each other, which means that the two items are not the same item as each other. For example, it may be said that "first information" and "second information" are distinct from each other, which indicates that the first information and second information are two separate pieces of information (e.g., two files—A.pdf and B.pdf—would be two "distinct" pieces of information).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage memories that store executable instructions to provide information, the instructions, when executed by a computer, causing the computer to perform acts comprising:
    receiving a request for first information;
    responding to said request by providing said first information, an item of said first information being associated with a geographic location;
    determining whether second information associated with said geographic location is available in a database, said second information being distinct from said first information;
    based on whether said second information is available in said database, either providing said second information with said first information or recording a fact that said second information is unavailable;
said database containing images, said database not containing an image of said geographic location, said acts further comprising:
    identifying a region in which to collect imagery based on predicted effectiveness of preventing failures to provide imagery in response to future requests.

2. The one or more computer-readable storage memories of claim 1, wherein said second information comprises an image of said geographic location.

3. The one or more computer-readable storage memories of claim 2, said acts further comprising:
    dispatching a vehicle to collect said image.

4. The one or more computer-readable storage memories of claim 3, said vehicle being a land vehicle, said image being a street-side image of said geographic location.

5. The one or more computer-readable storage memories of claim 1, said acts further comprising:
    dispatching a vehicle to collect imagery of said region.

6. The one or more computer-readable storage memories of claim 1, said region being identified, and said effectiveness determined, based on geographic density of past failures to provide imagery in response to past requests.

7. The one or more computer-readable storage memories of claim 1, said region being identified, and said effectiveness determined, based on frequency of failures of to provide imagery in response to past requests.

8. The one or more computer-readable storage memories of claim 1, said region being identified, and said effectiveness determined, based on an upward trend of requests in said region.

9. A method of performing an action based on geographic locations associated with requests for first information, the method comprising:
    using a processor to perform acts comprising:
        receiving requests for said first information;
        determining geographic locations associated with items of said first information;
        recording said geographic locations in a history;
        identifying a region that contains one or more of said geographic locations; and
        taking an action with respect to said region, wherein said action comprises either collecting second information in said region or directing a future search result to a specific location in said region, said action being to direct a future search result to a specific location in said region, said requests comprising a query that identifies said region but that does not identify said specific location in said region, said acts further comprising:
        providing, to a user who issued said query, said specific location as a result based on how many past requests for said specific location have been received.

10. The method of claim 9, said second information being imagery, said action being to collect second information by photographing said imagery.

11. The method of claim 10, said acts further comprising:
    using a vehicle to collect said imagery.

12. The method of claim 11, said imagery being street-side photos, said acts further comprising:
    using a land vehicle to collect said street-side photos.

13. The method of claim 9, said second information being imagery, said action being to collect second information by photographing said imagery, said identifying of said region comprising:
    determining that photographing said region is expected to reduce future failures to provide imagery of geographic locations associated with future requested locations.

14. The method of claim 13, expected effectiveness of reduction of future failures being determined based on geographic density of past failures to provide imagery in response to past requests.

15. The method of claim 13, expected effectiveness of reduction of future failures being determined based on frequency of failures of to provide imagery in response to past requests.

16. The method of claim 13, expected effectiveness of reduction of future failures being determined based on an upward trend of requests in said region.

17. A system for providing information, the system comprising:
    a memory;
    a processor; and one or more components that are stored in said memory and that execute on said processor, the one or more components comprising:
- a search engine that receives a query, that provides a result based on said query, that determines a geographic location associated with said result, that consults a database to determine whether an image associated with said geographic location is available, that provides said image if said image is available, and that creates an unavailability record for said geographic location if said image is not available; and
- an unavailability analyzer that identifies a region in which collection of information is expected to be effective at reducing unavailability of images in response to future requests.

18. The system of claim 17, in which said unavailability analyzer determines effectiveness at reducing unavailability of images based on geographic density of past failures to provide imagery in response to past queries and based on frequency of failures of to provide imagery in response to past queries.

19. The system of claim 17, in which said unavailability analyzer determines effectiveness at reducing unavailability of images based on an upward trend of requests in said region.

20. The system of claim 17, further comprising:
- a dispatcher that dispatches a vehicle to said region with a list of areas to capture imagery.

* * * * *